United States Patent [19]

Leon

[11] Patent Number: 5,064,045

[45] Date of Patent: Nov. 12, 1991

[54] MATERIAL HANDLING CONVEYOR

[75] Inventor: Michael A. Leon, Orlando, Fla.

[73] Assignee: FMC Corporation, Chicago, Ill.

[21] Appl. No.: 641,319

[22] Filed: Jan. 15, 1991

Related U.S. Application Data

[63] Continuation of Ser. No. 379,022, Jul. 12, 1989, abandoned.

[51] Int. Cl.[5] .............................................. B65G 13/00
[52] U.S. Cl. ................................. 193/35 MD; 193/37
[58] Field of Search ................ 193/35 MD, 35 R, 37, 193/782, 786, 787; 384/427, 279, 275

[56] References Cited

U.S. PATENT DOCUMENTS

| | | | |
|---|---|---|---|
| 3,155,441 | 11/1964 | Bemmann | 384/279 |
| 3,363,735 | 1/1968 | Hotchkiss | 193/37 |
| 3,445,148 | 5/1969 | Harris et al. | 384/279 |
| 3,621,961 | 11/1971 | Stumpf | 193/37 |
| 3,840,102 | 10/1974 | Dawson | 193/35 R |
| 4,042,248 | 8/1977 | Williamitis | 384/387 X |
| 4,462,493 | 7/1984 | Nordstrom | 193/35 R |
| 4,575,429 | 3/1986 | Jacobson | 384/279 X |
| 4,582,368 | 4/1986 | Fujita et al. | 384/279 X |
| 4,685,184 | 8/1987 | Satkamp | 384/275 X |

FOREIGN PATENT DOCUMENTS

| | | | |
|---|---|---|---|
| 1061694 | 7/1959 | Fed. Rep. of Germany | 193/35 MD |
| 0264111 | 11/1987 | Japan | 193/35 MD |
| 2174966 | 11/1986 | United Kingdom | 193/35 MD |

Primary Examiner—D. Glenn Dayoan
Attorney, Agent, or Firm—Ronald C. Kamp; R. B. Megley

[57] ABSTRACT

A cluster for a material handling conveyor in which a plurality of rollers are mounted on a body member at an acute angle to a driven shaft, with bushing pressed into and recessed from each end of each roller to provide a consistent frictional force between the rollers and the member under various conditions of moisture.

3 Claims, 1 Drawing Sheet

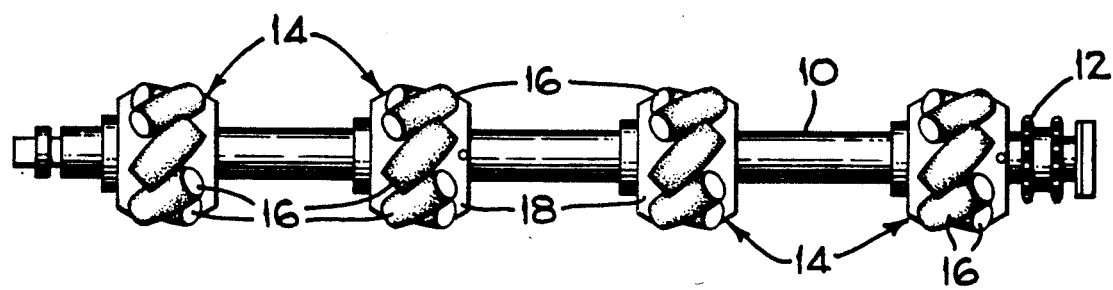
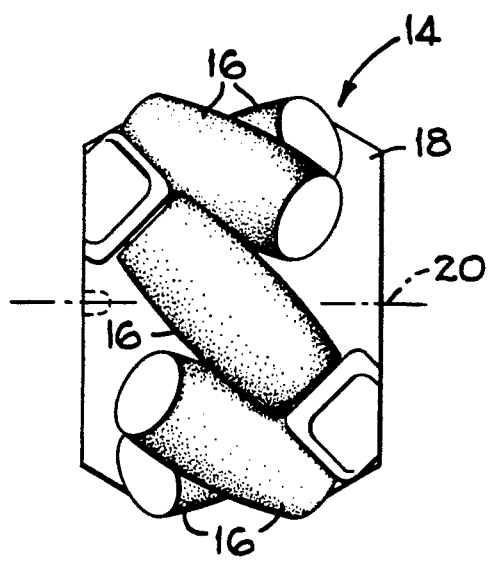
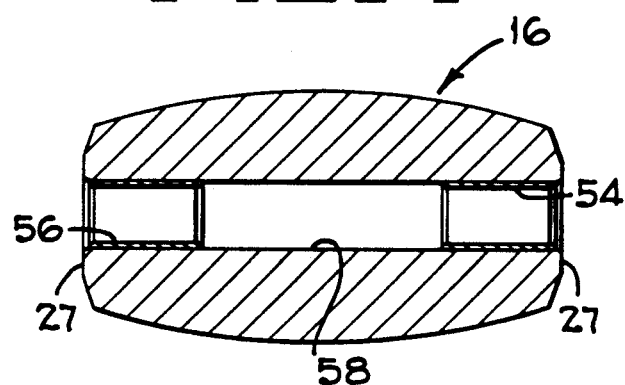
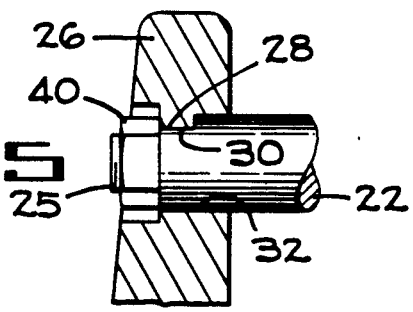
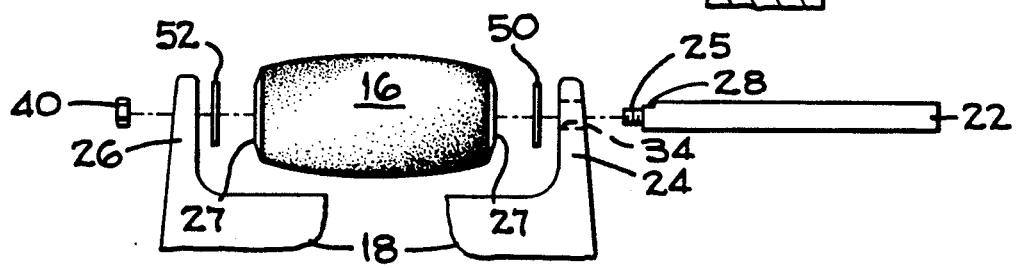

MATERIAL HANDLING CONVEYOR

This application is a continuation of application Ser. No. 379,022, filed July 12, 1989, now abandoned.

This invention relates generally to material handling conveyors, and more particularly to such conveyors which utilize a plurality of clusters with freely rotatable rollers affixed to selectively powered shafts.

Friction is an important factor in the performance of any material handling conveyor, but is especially important in those conveyors that employ multiple clusters attached to shafts with each cluster having a number of free rotatable barrell-shaped rollers arranged around the periphery of the cluster with the axis of rotation for the rollers set at an angle to the axis of the shaft to which the cluster is attached, such as conveyors of the type disclosed and claimed in U.S. patent application Ser. No. 06/781,443, filed Sept. 27, 1985. Such conveyors are capable of rotating any flat-bottomed object about a vertical axis or in any direction by selectively controlling the direction of rotation of the shafts on which the clusters are attached. The motion of the object is determined by the summation of the friction forces (magnitude and direction) exerted by the rollers on the flat-bottom. Friction forces should, and ideally do, act in a direction which is parallel to the axis of the shaft on which the roller is mounted. Friction forces which act perpendicular to this shaft axis detract from the efficiency and responsiveness of the conveyor. It is also important that such detrimental forces be substantially the same whether wet or dry.

The present invention provides a cluster for a material handling conveyor which functions substantially the same whether it is wet or dry, which provides low frictional forces relative to rotation of the rollers about their axes, which is relatively inexpensive to manufacture and maintain, which may readily be retrofitted to existing conveyors, and which has relatively high reliability and responsiveness.

These and other objects of the present invention will become more readily apparent from a perusal of the following detailed description and the accompany drawings, wherein:

FIG. 1 is a plan view of shaft used in a material handling conveyor incorporating the present invention;

FIG. 2 is a plan view of one of the clusters shown in FIG. 1;

FIG. 3 is an expanded view illustrating the mounting of one of the rollers of the cluster shown in FIG. 2;

FIG. 4 is a longitudinal cross-section of the roller and a portion of the cluster shown in FIG. 3; and FIG. 5 is a detailed sectional view of the connection of the roller shaft to the cluster.

Referring now to FIG. 1, there is shown one shaft 10 of the plurality of shafts arranged on a frame and selectively driven by a chain trained over the sprocket 12 and a sprocket affixed to and driven by a reversible motor, as shown and described in the aforementioned patent application. A plurality of clusters 14 are affixed to the shaft 10 for rotation therewith. As shown best in FIG. 2, a plurality of rollers 16 are arranged around the periphery of the body 18 of the cluster 14 and set at an angle of about 45 degrees relative to the axis 20 of the cluster 14. The rollers 16 are shaped to essentially define the surface of the central portion of a sphere and comprise the surfaces contacting the flat-bottomed object.

Referring to FIG. 3, the roller 16 is mounted for rotation on a shaft 22 which extends between a pair of outward-extending legs 24 and 26 formed on the body 18. The shaft 22 is retained in this position and restrained from rotation by a flat 28 formed on one end of the shaft 22, which end terminates in a reduced diameter threaded portion 25. The leg 26 has a D-shaped hole 30, as best seen in FIG. 5, which intersects with a bore 32 extending from the inner surface of the leg 26. The bore 32 is slightly larger than the major diameter of the shaft 22, as is an aligned bore 34 formed in the opposite leg 24. To assembly, the threaded end of the shaft 22 is inserted through the hole 34, the roller 16 and the hole 32 with the flat 28 engaging the D-shaped hole 30. A locking nut 40 engages the threaded end 25 to hold the assembly in place.

Flat washers 50 and 52 are positioned on the shaft 22 between the ends of the roller 16 and the inner side of the legs 24 and 26 respectively. These washers 50 and 52 are made of a hard material having a low coefficient of friction with the material of the ends of the roller 16, which may be made of an aluminum alloy. A suitable material for these washers 50 and 52 is molybdenum filled nylon. The end surfaces 27 of the roller 16 function as the bearing surfaces for washers 50 and 52; the relative rotation being between the rotating roller and the stationary washers. As shown in FIG. 4 bushings 54 and 56 are pressed into a central bore 58 formed in the roller 16. The shaft is preferably polished and made of a material which will not oxidize, such as stainless steel, so that water will not adversely affect performance of the roller. The bushings 54 and 56, therefore, must be composed of a material compatible with the shaft 22 and also possess a low coefficient of friction. A bushing that has been found to operate with superior results is a mild steel coated with a porous bronze which has been impregnated with polytetrafluoroethylene and lead. The combination of flat nylon washers at the ends of the roller 16 and the aforementioned bushings in the roller bore 58 to engage the stainless steel shaft 22 have produced superior results in both wet and dry conditions.

While one embodiment of the present invention has been shown and described herein, it will be appreciated that various changes may be made therein without departing from the spirit of the invention as defined by the scope of the appended claims.

What is claimed is:

1. A cluster for use in a material handing conveyor having a number of driven shafts comprising:
   a body member for non-rotational mounting on one of said driven shafts;
   a plurality of rollers, each of which has a central bore;
   a pair of legs formed on said body member for mounting each roller on the periphery of said body member;
   a pair of bushings, one bushing being pressed into and recessed below each end of the central bore of each roller;
   a roller shaft, made of a material which will not oxidize and which has a low coefficient of friction with respect to said bushings, extending through each of said pair of legs and said bushings of each roller at an angle to said driven shaft and retained in said pair of legs; and
   a washer interposed on said roller shaft at each end of the roller, each washer being incapable of engaging the bushing and engageable directly by, but independently rotatable relative to, the roller and being formed of a hard material having a low coefficient of friction with respect to the roller.

2. The invention according to claim 1 wherein said washers are formed of molybdenum filled nylon.

3. The invention according to claim 1 wherein said bushings are made of a mild steel coated with a porous bronze which has been impregnated with polytetrafluoroethylene and lead.

* * * * *